June 18, 1968 T. J. TREPPA ET AL 3,389,239
METHOD AND MEANS FOR TESTING WELDING EQUIPMENT
Filed Feb. 11, 1964 2 Sheets-Sheet 1
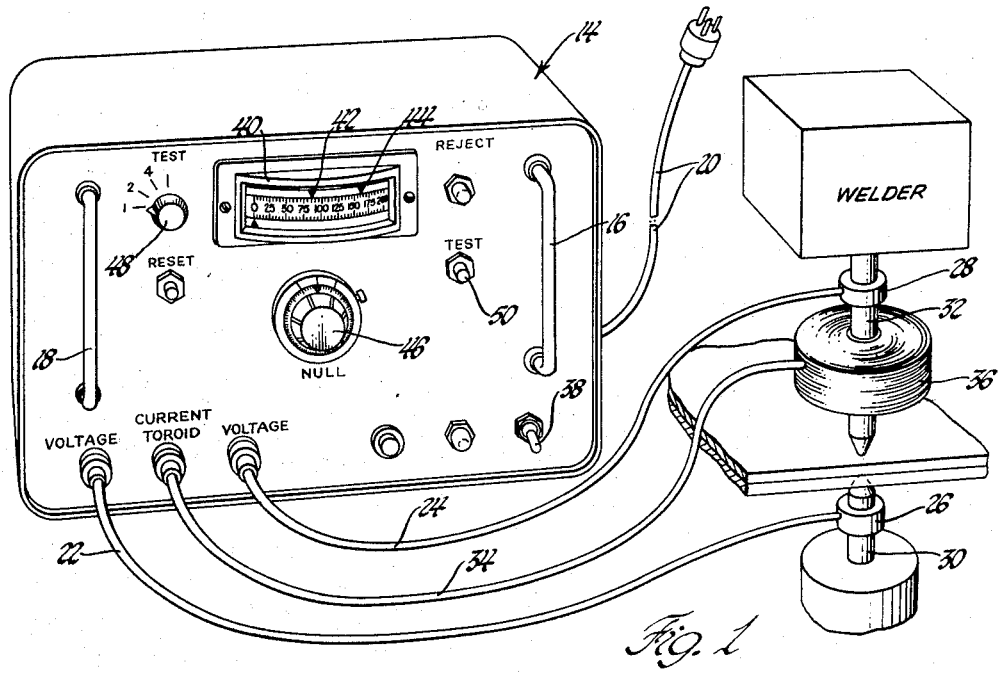
Fig. 1
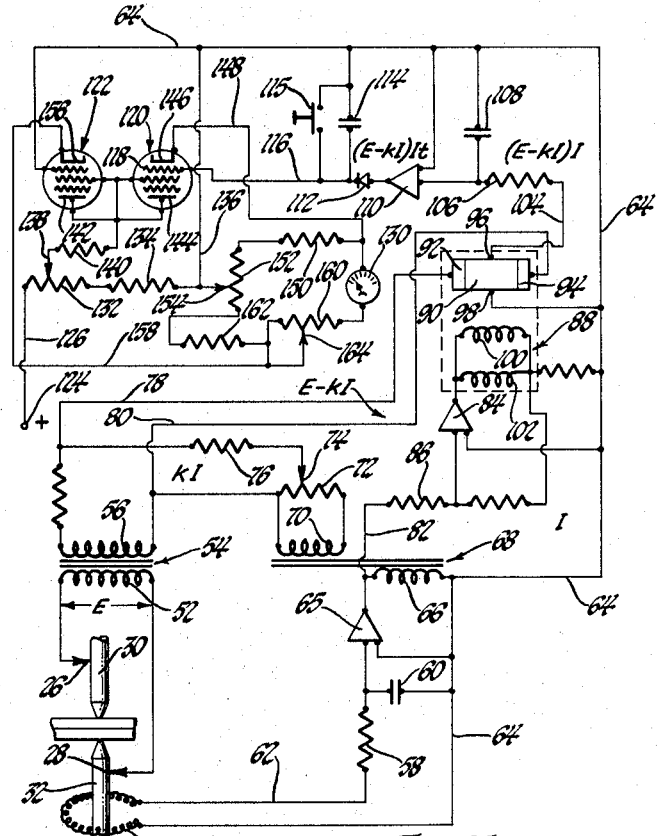
Fig. 3
Fig. 2
INVENTORS
Thomas J. Treppa,
Frederick J. Trulson,
& Robert B. Allured
ATTORNEY

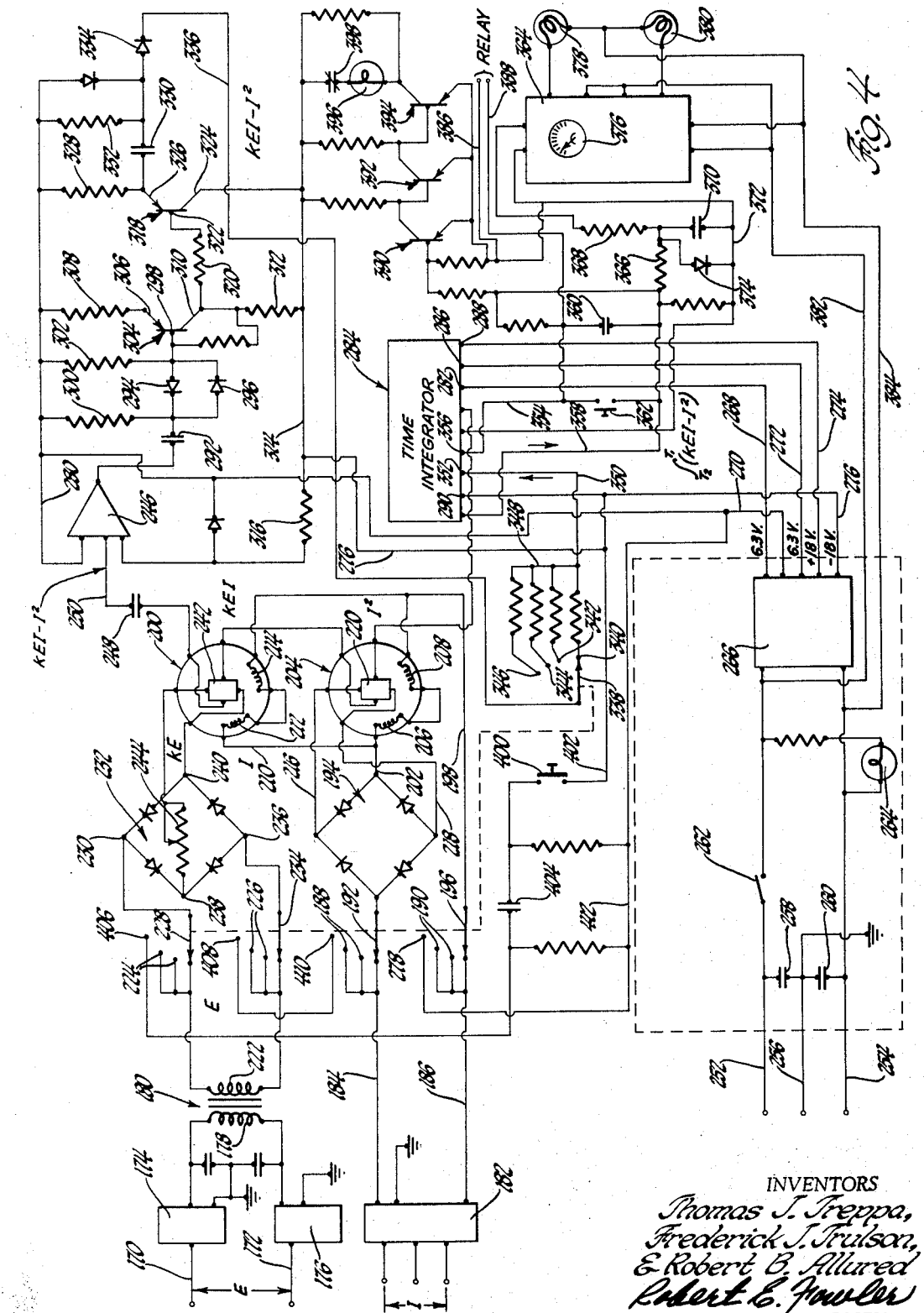

United States Patent Office 3,389,239
Patented June 18, 1968

3,389,239
METHOD AND MEANS FOR TESTING
WELDING EQUIPMENT
Thomas J. Treppa, Warren, Frederick J. Trulson, Detroit, and Robert B. Allured, Rochester, Mich., assignors to General Motors Corporation, Detroit, Mich., a corporation of Delaware
Filed Feb. 11, 1964, Ser. No. 344,135
11 Claims. (Cl. 219—110)

ABSTRACT OF THE DISCLOSURE

A spot welder having a circuit for measuring the energy developed across the weld nugget per se. The circuit includes pickups for sensing weld current and total electrode voltage. There is also another circuit for subtracting a signal proportional to the current from the voltage signal and other circuits which multiply the difference by the welding current. The product signal resulting from this multiplication is then integrated and utilized to drive an indicating meter or a welding control device.

---

This invention relates to indicating means for determining the quality of welds during the formation thereof and more specifically to a metering device which can be applied to an operating welding machine and which will indicate whether welds being made fall within said predetermined tolerance limits.

Today welding is used widely for the fabricating of various devices and parts and automatic welding machines which are used over extended time periods may vary in their performance without the operator's knowledge to the extent that parts fabricated thereby may become unusable. Such machines should be periodically checked and adjusted to make sure that they are working properly. This is particularly true on automatic assembly lines where parts are automatically fed to welders, welded in a plurality of positions, and automatically discharged with little or no supervision. It has been difficult in the past to provide non-destructive means for determining whether welds have satisfactory strength without sampling at intervals to physically destroy parts and determine whether such welds are coming through the line of proper strength.

It is an object in making this invention to provide a weld quality analyzer or meter which is portable and can be carried into a plant or manufacturing area and applied to a welding machine to check and test the welds being made or fabricated during its normal operation.

It is a further object in making this invention to provide a weld analyzer which can be applied to an operating welder and which, if the indications fall within a predetermined range, will operate signaling means to indicate the fabrication of satisfactory or unsatisfactory welds.

It is a still further object in making this invention to provide a weld quality analyzer which operates on the principle of measuring the energy dissipated within the weld nugget per se as a basis for determining the satisfactory or unsatisfactory weld.

With these and other objects in view which will become apparent as the specification proceeds, our invention will be best understood by reference to the following specification and claims and the illustrations in the accompanying drawings, in which:

FIGURE 1 is a sketch of a weld quality meter embodying our invention as applied to the electrodes of a welding machine;

FIG. 2 is a schematic circuit diagram for describing the basic principles of our invention;

FIG. 3 is a circuit diagram of a complete circuit embodying a weld quality meter embodying our invention; and, FIG. 4 is an additional and more elaborate circuit diagram of a weld quality meter embodying our invention.

In the past there have been devices which purported to determine the quality of welds produced by welding machines by measuring the voltage applied across the electrodes at the time the weld was made. However, this has not proven to be a very satisfactory gauge of whether or not the nugget per se forms properly and produces a satisfactory bond between the parts. There are several places in the series circuit between one welding electrode and the other through the parts and weld at which voltage drops may occur which have nothing to do with the creation of heat at the desired interface point or nugget and, therefore, do not contribute to the formation of a proper bond. For example, there may be a voltage drop between the ends of either of the electrodes and the part which it contacts due to surface coating resistance and further drop through the parts to the vicinity of the nugget caused by the resistance of the material. It has been discovered that it is possible to develop a signal which is proportional to the various separate voltage drops other than that across the welding nugget per se and this being so the present circuit utilizes such a signal and subtracts such proportional voltage from the overall applied voltage to produce a resultant voltage which is equivalent or proportional to that across the nugget itself. This resultant voltage multiplied by current and time to give an energy reading then gives a reliable and satisfactory indication or reading as to the quality of the weld produced and the results of the use of this meter have been excellent.

As illustrative of this theory, reference is made to FIG. 2 where there are diagrammatically shown two sheets 2 and 4 which it is desired to weld together by the formation of a weld nugget 6. The two arrows 8 and 10 represent the welding electrodes and ordinarily there is applied a total voltage E. This total voltage is utilized partially in the drop through one electrode and its surface contact with one side of one sheet and the penetration through that sheet to the nugget. This may be indicated by a voltage $\frac{1}{2}e$. This voltage drop, of course, occurs on both sides of the weld. The voltage total voltage $E-(\frac{1}{2}e+\frac{1}{2}e)$ then equals the remaining voltage across the weld nugget and is the voltage it is desired to ascertain in order to compute the energy dissipated in only the weld nugget to determine whether or not a satisfactory weld is being made. The amount of current flowing in the welding circuit may be indicated as I and is shown as a sine wave form appearing in that portion of the circuit. A schematic meter is shown at point 12. The length of time that the current I flows may be assumed to be $t$ and is indicated as several cycles on the diagram, FIG. 2. The energy, therefore, applied to the welding nugget to produce heat and melt the metal for bonding may be written in formula form as $(E-e)It$. Basically this is the theory on which the current invention resides and the system is so devised as to read such a value.

Proceeding now to the actual physical construction of the meter, FIG. 1 shows the basic meter consisting of a casing 14 within which the electronic equipment and wiring is housed having on its front panel a pair of handles 16 and 18 for carrying and lifting the meter to the desired positions of use. A power supply cord 20 may be plugged into a satisfactory supply of electrical power such as the conventional 115 volt, 60 cycle power. A pair of leads 22 and 24 having contacts 26 and 28 on their ends can be clamped on to the welding electrodes such as 30 and 32 in order to read the voltage E applicable across the electrodes. Lead 34 is connected to a toroidal coil 36 which is a current transformer and has current induced therein from a flow of current through the welding electrode to develop a voltage proportional to the welding current. An On-Off switch 38 is provided on the control panel as well as meter 40 which has adjustably settable limit points 42 and 44 for high and low setting of operation. There is also provided a null adjustment rheostat 46 which is moved during set up of the meter and whose operation will be fully explained later. The meter is also provided to operate over different ranges and can be set to these by movement of control knob 48. Movement of this knob to its last position which is marked "Test" allows the meter to be initially tested for proper operation. When it is moved to this position, the pressure switch 50 marked "Test" is pressed to accomplish this.

FIG. 3 discloses a relatively simple circuit embodying the principles of our invention and will be first discussed in detail. In that figure the toroidal coil 36 is shown surrounding the welding electrode 32 as shown in FIG. 1 and the contacts for voltage measurement 28 and 26 are shown connected to the welding electrodes. The voltage across electrodes 26 and 28 and, therefore, applied to the primary 52 of transformer 54 is equivalent to voltage E of the formula heretofore described. This voltage induces a voltage in secondary 56 in which circuit it is mixed with a voltage which is proportional to the welding current times a constant of $kI$ which, for reasons to be explained, is proportional to the voltage $e$ or that voltage absorbed by all other voltage drops except that across the nugget per se. This voltage is derived from the current induced in the induction pick-up coil 36 and applied through a filter consisting of resistance 58 and condenser 60 connected to lines 62 and 64 running from the pick-up coil and then applied to amplifier 65. The output of the amplifier is fed into the primary winding 66 of a transformer 68 whose secondary winding 70 has a potentiometer 72 connected thereacross over which a movable tap 74 passes. Tap 74 is connected through limiting resistor 76 to line 78 and one end of the transformer secondary 70 is directly connected to the other line 80 from the secondary 56 of transformer 54. This introduces in proper inverse phase relation a signal equivalent to $e$ or $kI$ into the circuit so that it will subtract from E so that the voltage now appearing on lines 78 and 80 is $E-kI$.

A voltage proportional to the current I only appears, as before described, across the primary winding 66 and also across the two lines 64 and 82 extending therefrom. This voltage is applied to a second amplifier 84 through a limiting resistance 86. The system to the point described has developed two signals, (1) proportional to $E-kI$ or the voltage across the nugget across lines 78–80, and (2) proportional to the weld current I across lines 82–64. It is now desired to multiply these two signals together to obtain the instantaneous power at the weld. This is accomplished through the use of a Hall crystal multiplier or Hall crystal generator which are commercial devices currently obtainable on the market from such firms as Beckman Instruments, who advertise them as Hallflex multipliers. These multipliers have crystal conductors having input and output terminals to the input of which one signal is applied. They also include control windings to which the signal to be multiplied with the first is applied and the product appears in the crystal output circuit.

In FIG. 3 the Hall multiplier 88 is shown in dotted outline and includes a crystal conductor 90 having input terminals 92 and 94 and output terminals 96 and 98. The multiplier also has two control windings 100 and 102 in this case connected across the output of amplifier 84 and to which the signal proportional to the current I is applied. The input terminals of the crystals 92 and 94 are connected to lines 78 and 80. Thus the signal appearing across lines 78 and 80, which is $E-kI$, and that appearing at the output of amplifier 84, which is proportional to I, are multiplied and the product appears across the output terminals 96 and 98 which are connected to lines 104 and 64. As previously mentioned this signal is now indicative of the instantaneous power. It is, however, desired to obtain a reading of the total energy applied to the weld and, therefore, this signal must be integrated over the length of time that the weld current flows. The output of the Hall multiplier is, therefore, integrated by the RC circuit including the series resistor 106 and a parallel condenser 108 connected to the lines 104 and 64. The resultant of this operation, therefore, stated formula-wise is $(E-kI)It$. The resultant signal is now indicative of the total energy applied to the weld nugget per se.

This total energy signal is now amplified in a third amplifier 110 which is connected to the output of the integrating circuit. A rectifier 112 is connected to the output of the amplifier 110. A conductor 116 connects the output of the rectifier with the control grid 118 of an amplifier tube 120. A storage condenser 114 is connected between the line 116 and line 64. The output signal from the rectifier 112 is stored on the condenser 114 and may then be read by any suitable measuring device. A normally open spring switch 115 is connected in shunt around the condenser 114 to discharge the same for re-setting purposes. The stored signal on condenser 114 at the end of a weld is indicative of the total amount of energy utilized in forming the nugget and is equivalent to $(E-kI)It$.

The remaining portion of the circuit is provided in order to indicate this value so that it can be visually read. This consists of two balanced electron tubes 120 and 122 connected in parallel between the positive and negative sides of the power supply so that they are normally balanced when no charge is present on the condenser 114 but which become unbalanced and provide a reading on the meter 130 as a charge appears. The power supply circuit for these two tubes is provided by a positive terminal 124 which is connected through conductive line 126 to one terminal of two resistors 132 and 134 in series and thence through conductor 136 to the negative line 64. An adjustable tap 138 on resistor 132 is connected through limiting resistor 140 to the plates 142 and 144 of the tubes 122 and 120, respectively, and also to the screen grids thereof. This supplies the proper potential to the plate circuit. The cathode 146 of tube 120 is connected through conductor 148 with one terminal of the meter 130 and also to one terminal of a bridge resistor 150. The opposite end of resistor 150 is connected to a second resistor 152 which has an adjustable tap 154 thereon which is connected to ground line 136. Thus the cathode 146 of tube 120 is connected to ground through the following connections: cathode 146, line 148, resistance 150, a portion of resistor 152, tap 154, line 136 to ground line 64. In a similar manner the cathode 156 of tube 122 is connected through line 158 intermediate two resistors 160 and 162, the remaining terminal of resistor 162 being connected to resistor 152. Cathode 156 is, therefore, connected to ground through the following connection: cathode 156, line 158, resistor 162, a portion of resistance 152, tap 154, line 136 to ground line 64. With terminal 124 connected to a source of positive potential tap 154 is moved until the flow of current through the two tubes including their cathode connections are balanced with no signal or voltage on the condenser 114 and the reading on meter 130 is then zero. The sensitivity of the meter may be changed by moving tap 164 over resistor 160 shunting out a portion thereof. In the operation of the indicating portion when a signal appears on the condenser 114 it is applied to the control grid 118 of tube 120 to change the current flow through that tube and unbalance the current flow through the paired tubes, thus unbalancing the voltage across the meter 130 to provide a reading. The meter may be calibrated in any suitable units.

In the operation of the overall system, the weld analyzer is brought into proximity with the welding machine and contacts 26 and 28 are physically conductively attached to the welding electrodes. Simultaneously the current transformer 36 is slipped over one of the electrodes and the power supply is connected to the meter. The reset switch 115 is closed to make sure that the condenser 114 is fully discharged and the welding machine is turned on to produce a weld. Through this operation the condenser 114 is charged up to a voltage proportional to the total energy applied to create the nugget over the time period of welding and thus reads the amount of actual energy utilized in the formation of the nugget. This will indicate to the operator whether a satisfactory amount of energy has been so consumed and utilized in forming a good weld.

The weld quality meter circuit shown in FIG. 4 is somewhat more sophisticated than that shown in FIG. 3 but is based on the same principles. That circuit is capable of being adjusted to operate over several different ranges and also to provide not only meter readings but signals which are usable for operating visual indicators or selective switches. In that circuit, which is the circuit actually used in the meter shown in FIG. 1, there are shown lines 170 and 172 which are actually those in cables 22 and 24 secured to the welding electrodes when in operation and across which the total weld voltage E appears. Both lines 170 and 172 are connected into connectors 174 and 176 on the front panel. These connectors are conductively joined to opposite ends of primary 178 of step-up transformer 180. The casings of the connectors are grounded. A third connector block 182 is used as a plug-in junction for the cable 34 which contains the indivdual lines extending to the current transformer 36 and across which a voltage proportional to the current I is obtained. This plug is connected through conductors 184 and 186 to various stationary contacts 188 and 190, respectively, of a multiposition-multigang switch to apply the output thereof to these contacts. A movable switch arm 192 moves over the contacts 188 and is connected to one corner of a rectifying bridge 194 while a similar ganged movable arm 196 mechanically connected to move with said first arm 192 may move over stationary contacts 190 for different operating ranges.

Movable switch arm 196 is connected through conductor 198 with one contact of Hall generator No. 1 identified by reference character 200. The other input terminal of the rectifier bridge 194 is connected through line 202 to one terminal of Hall generator No. 2 identified by reference character 204. Each Hall generator as fully described earlier in the case with respect to the circuit shown in FIG. 3 consists of a crystal conductor having input and output terminals and a plurality of field coils. In this particular instance the two field coils of both Hall generator No. 1 and Hall generator No. 2 are connected in series. Conductor 202 is connected to one terminal of a first field coil 206 of the second Hall generator 204 which is connected in series with a second field coil 208. Line 202 is likewise connected through tie line 210 with one terminal of a first field coil 212 of first Hall generator 200 which is connected in series with a second field coil 214. The remaining terminal of the second field coil 214 is connected to line 198 previously mentioned. The output of the rectifier bridge 194 is connected directed through lines 216 and 218 to the input terminals of the crystal conductor 220 of the second Hall generator 204.

The secondary winding 222 of the step-up transformer 180 has one terminal connected to a series of stationary contacts 224 and its other terminal connected to a similar series of stationary contacts 226 which comprise a further portion of the multiple gang switch previously mentioned. Movable switch arm 228 moves over the series of stationary contacts 224 and is connected to one of the input terminals 230 of a further rectifying bridge 232. Similarly switch arm 234 is movable over stationary contacts 226 and is connected to the opposite input terminal 236 of the bridge 232. Through these connections a signal proportional to the total voltage E applied across the welding electrodes is applied to the rectifier bridge 232. The output of this bridge appears across output terminals 238 and 240 and is applied to the input terminals of crystal 242 of first Hall generator 200. A variable resistor 244 appears in one line for adjusting the signal to a null point. The signal input to the rectifier bridge 232 is equivalent to the total voltage E and the output from that bridge is equvalent to $kE$ and is applied across the crystal 242.

A signal proportional to the current I is applied to the field coils 212 and 214 through the conductors 210 and 198 and, therefore, the output of the Hall generator No. 1 or that identified with reference character 200 is $kEI$. On the other hand the signal applied to the Hall generator No. 2 or that referred to by reference character 204 is proportional to $I^2$ since the input to the crystal 220 is that taken from the output of the rectifier bridge 194 which is proportional to I multiplied by a second signal applied to the field coils 206 and 208 proportional to I and as a result the output of this generator is equivalent to $I^2$. The output signals of Hall generator No. 1 (200) and Hall generator No. 2 (204) are connected in series opposing so that one subtracts from the other and the resultant signal is applied to the input of a series of amplifiers the first of which is identified at 246. This composite signal, the derivation of which will be described more in detail later, is applied to the input through coupling condenser 248 and line 250.

At this point it is desired to depart momentarily from the main signal circuit to describe the power supply and the application of the proper power to the different portions of the system. Conventional power supply is connected to incoming lines 252 and 254 from any suitable source of alternating current. The cable shield is grounded through a ground line 256 as shown and filter condensers 258 and 260 are connected between the lines and ground to discharge any unwanted frequencies. A main power switch 262 is connected in one line and an indicating lamp 264 is connected across the lines to indicate when the power switch 262 is closed and power is supplied to the power supply unit 266. This may be any one of a series of commercial units for providing the different voltage either AC or DC required for the operation of the various elements used. For example, and in nowise in a limiting sense, various illustrative voltages will be indicated on the different power supply lines. For example, line 268 from the output might provide 6.3 volts; line 270 could be a ground return line or common; line 272 might be another 6.3 volt line, and lines 274 and 276 might, for example, be $+18$ volts and $-18$ volts, respectively. Line 270, that described as the common line or return line, is connected directly to a fourth contact 278 of the lowest of the four ganged switches to the input of the two Hall generators and is engageable by rotatable switch arm 196. It is also connected directly to a tie ground return line 280 in the amplifier section. One of the low voltage lines, line 268, is connected to terminal 282 in the time integrator section 284 and second low voltage line 272 is connected to a similar contact 286 in that section. One of the higher voltage lines 274 is connected to contact 288 servicing the time integrator section 284. Lastly, power line 276 is connected to contact 290 for providing a further power input. Through these connections power of the proper voltage is supplied to the various portions of the meter.

Returning to the next stage of the meter system, as previously stated the output from the two Hall generators connected in series is equivalent to the signal $kEI-I^2$ which appears on line 250 and is applied to the input of the amplifier 246. The output from the amplifier is applied through a coupling condenser 292 and a section utilized for shaping the waves which includes a pair of rectifiers 294 and 296 connected in parallel and in opposed polarity to the base electrode 298 of a two-stage transistor amplifier. To complete the wave forming section a first resistor 300 is connected from the ground or common line 280 to a point between the coupling condenser 292 and rectifier 294 and a second resistance 302 connected between the ground line and the opposite end of the rectifier 294. Thus the output of the amplifier is shaped and applied to the input of the second amplifier which is a two-stage transistor section.

The first transistor 304 of this amplifier has its emitter electrode 306 connected through resistance 308 with the ground line 280 and its collector 310 supplied with the proper voltage through resistance 312 which has its opposite terminal connected to line 314 which is connected through various tie lines to line 276 which is one of the high voltage lines from the power supply 266. It might be mentioned at this point that power line 276 likewise supplies proper power through resistance 316 to the amplifier 246. The output of the first section of this amplifier is coupled into the second section which includes transistor 318 through a coupling resistance 320 connected directly between the collector electrode 310 of the first transistor 304 and the base electrode 322 of the second transistor 318. The second transistor is provided with the proper power since its collector electrode 324 is connected directly to power line 314 and its emitter electrode 326 is connected through resistance 328 to the ground return line 280. Similarly the output of this stage which is taken from the emitter electrode in this instance is wave shaped through a filter consisting of series condenser 330 and shunt resistance 332 connected to ground and this signal is applied through a rectifier 334 to output line 336.

This signal is now proportional to an amplified version of $kEI-I^2$ and which is a reading of the instantaneous power applied to the weld nugget. At this point it is desired to integrate this signal over the time period for which it is applied to make the nugget and it is now fed into the time integrator 284. This portion of the circuit is shown in block diagram form and has been previously described as far as the application of the proper power is concerned. Line 336 is connected directly to movable switch arm 338 of an additional portion of the gang switch as shown by dash line connection. It is movable over a series of stationary contacts 340, 342, 344 and 346. These stationary contacts are each connected to one terminal of a resistor of varying value the opposite terminals of which are commonly connected to line 348 and to input line 350 of the time integrator at contact 352. The other input terminal includes line 354 and is connected to stationary terminal 356. In this section the the signal is integrated over a time period $t$ and when it emerges is proportional to the following formula $$\int_{t_2}^{t_1}(kEI-I^2)dt$$

This appears on line 358. A storage condenser 360 is connected across between line 354 and line 358 and stores the output signal which is later applied to the indicating apparatus or control apparatus.

The integrated signal appearing on condenser 360 may be discharged by closing the reset switch 362 which is connected in parallel therewith. This is a normal open spring switch but is only closed to be sure that the condenser is discharged at the initiation of a new test or run. Between the output of the storage condenser 360 and the indicating meter 364 there is a damping circuit to prevent the too sudden application of the signal to the meter. This damping circuit includes two series resistors 366 and 368 in series between line 358 and the input to the meter 364 and a shunt condenser 370 connected across between a point intermediate the two resistors and line 372. A rectifier 374 is likewise connected in shunt to the condenser 370. A visual meter 376 is included in the output meter 364 which may be calibrated with any desired scale and whose reading may indicate the integrated energy applied to form the nugget per se. If the reading falls within predetermined limits then the weld is known to be satisfactory. If it is desired to provide further indicating means so that the operator will not necessarily have to read the dial carefully the output meter 364 may be provided with lights 378 380 connected thereto which can be so connected to the meter and to the main source of power through lines 382 and 384 that they are lit if the signal falls outside predetermined limits. In other words, light 378 may light if the signal exceeds a high limit or light 380 may be illuminated or energized if the signal falls below a low limit. The output may also be used to operate various relays for indicating purposes. Line 386 connected to line 372 and line 388 connected to line 354 have the integrated signal applied thereto and this signal may be used specifically for operating a relay for control purposes.

In addition, a specific reject circuit including amplifying means, a visual indicator and a control relay may be provided which is likewise connected across these same lines. The amplifier consists of a multistage transistor amplifier including transistors 390, 392 and 394 connected in cascade across the output of the time integrator, the final amplified output of which is applied to a visual indicating light 396 which is connected in series with a set of normally closed relay contacts 398 will indicate or control various equipment in the event that the weld is unsatisfactory.

Finally, there is provided a test circuit for checking the meter prior to its use to determine that it is in proper order before it is used to check the operation of a certain welder. This test circuit utilizes the fourth position of the multiposition gang switch for range setting purposes and includes a push-button switch 400 which is connected in a power line 402 between line 276 and a coupling condenser 404. The coupling condenser in turn is connected to stationary contact 406 of the uppermost of the gang switches and is engageable by movable switch arm 228. Uppermost stationary contacts 408 and 410 of the next two gang switches are connected together and these two contacts are engageable by arms 234 and 192. Lastly, stationary contact 278 of the lowermost switch is connected to tie line 412 which extends over to common return line 270. To complete the testing section, the last contact of the range switch includes a resistor of predetermined size so that when the multiposition switch including movable arms 338, 196, 192, 234 and 228 are all moved to the upper or test position, such as shown in FIG. 1 at the top, and the test switch 50 is closed the reading on the meter may then be adjusted to a given value since the input is known.

The initial adjustment of the meter for checking any particular welder must be made each time the meter is applied to a different machine. It is basically the variation in the null adjustment that was mentioned earlier in the specification and is accomplished by rotation of the knob 46 on the front panel. Rotation of this knob moves the adjustable tap on the resistor 244 (FIG. 4) to balance the bridge input to the multipliers. The purpose of this adjustment is to balance out all of the energy which may be caused due to losses in the circuit so that it will read only the energy actually utilized in the weld nugget. After the analyzer has been connected to the power lines and the cables 22, 24 and 34 are properly connected and associated with the welding electrodes, the power is turned on. The selector switch 48 is rotated to test position and the reset button is depressed. This discharges the circuit feeding the meter and returns the meter to zero. With the meter 40 at zero the test button is then depressed. This should provide a full scale reading of the meter. The reset button is then depressed to return the meter to zero which indicates proper operation of the meter. The null potentiometer 46 is now turned to zero and the selector switch 48 turned to position 1. A single thickness of the material to be welded is then clamped between the electrodes 30 and 32 of the welder and the welder is fired. The operator then observes the reading on the meter 40, presses the reset button to reset the meter to zero and increases the potentiometer setting 46. The test sheet between the electrodes is moved to a new spot and the welder fired again, the operator observing the meter reading. The reading should be lower than before as the amount of resistance is changed. This procedure is repeated until the meter reading approaches zero, thus indicating that the losses through a single sheet have been balanced out. Any additional energy due to the nugget which the meter now reads on making an ordinary weld would, therefore, be due to energy absorbed in the weld per se. The null potentiometer is now in the correct position and will not have to be moved as long as the material remains the same and weld meter applied to the same welder. In order to determine a range of energy readings on the meter which will make acceptable welds, the meter is adjusted by trial. Two sheets to be welded are clamped between the electrodes and fired with a minium current setting in the welder and the weld then destroyed by pulling apart to see if it is good. When the weld fails at too low current and becomes unsatisfactory the reading of the meter determines the position of the minimum indicator 42. Weld current can then be increased and in like manner a series of sample welds made until flash-over is obtained and the position of maximum indicator 44 determined. The operator will then know that the device is operating satisfactorily. The different ranges are provided by the different values of resistance connected to terminals 340, 342 and 344 as the range switch 48 is rotated.

It will thus be seen that the present invention provides a weld quality meter which is operated by only the energy which has been actually used to create or develop the weld nugget per se, which integrated energy provides various indications either visual or meter readings or the operation of relay means to indicate to the operator whether a satisfactory weld has been made by the normal performance of the welding machine.

What is claimed is:

1. In a measuring device for determining the quality of a weld produced by the application of electrical power to a pair of welding electrodes engaging to opposite sides of parts to be welded together, comprising means connectible to the welding electrodes for developing a signal proportional to the total voltage across the electrodes during the weld, means adapted to be brought into proximity with the welding electrodes in which a signal proportional to the welding current flowing is developed connected to said first-named means in inverse phase to the signal proportional to the total voltage so that the resultant composite signal in the circuit is $E-kI$, where $E$ is the total voltage across the welding electrodes, $k$ is a constant and $I$ is the welding current flowing at any given instant, signal multiplier means including a crystal and field creating inductors, said composite signal being fed to the crystal to develop a current flow therethrough, said inductors being connected to the means in which a signal proportional to the weld current is developed to multiply the composite signal by a signal proportional to the current to produce in the output circuit of the signal multiplier a signal equivalent to $(E-kI)$ $I$ to give an instantaneous reading of the power across the weld nugget or that across the welding electrodes minus the power drop in other portions of the circuit between the welding electrodes exclusive of that across the nugget, and utilization means connected to the output circuit of the signal multiplier and responsive to the output thereof.

2. In a measuring device for determining the quality of a weld produced by the application of electrical power to a pair of welding electrodes engaging the opposite sides of parts to be welded together, comprising means connectible to the welding electrodes for developing a signal proportional to the total voltage across the welding electrodes at any time during the period when the weld is produced, means adapted to be brought into proximity with the welding electrodes in which a signal proportional to the weld current flowing is developed connected to said first-named means in inverse phase to the signal proportional to the voltage so that the resultant composite signal in the circuit is $E-kI$, where E is the voltage across the welding electrodes, $k$ is a constant and I is the welding current flowing at any given instant. Hall multiplier means including a crystal and field creating inductors, said composite signal being fed to the crystal to develop a current flow therethrough, said inductors being connected to the means in which a signal proportional to the weld current is developed to multiply the composite signal by a signal proportional to the current to produce in the output circuit of the Hall multiplier a signal equivalent to $(E-kI)$ $I$ to give an instantaneous reading of the total power or voltage across the welding electrodes minus the voltage drop in other portions of the welded members exclusive of the nugget multiplied by the current, integrating means connected to the output of the Hall multiplier to store the instantaneous power signal over the period of the weld to produce a signal proportional to the total amount of power consumed in producing the nugget per se exclusive of any loss of power in voltage drops through other portions of the circuit, and utilization means connected to the output circuit of the integrating means and responsive to the output thereof.

3. In a measuring device for determining the quality of a weld produced by the application of electrical power to a pair of welding electrodes engaging the opposite sides of parts to be welded together, comprising means connectible to the welding electrodes for developing a signal proportional to the total voltage across the welding electrodes at any time during the period when the weld is produced, means adapted to be brought into proximity with the welding electrodes in which a signal proportional to the weld current flowing is developed connected to said first-named means in inverse phase to the signal proportional to the voltage so that the resultant composite signal in the circuit is $E-kI$, where E is the voltage across the welding electrodes, $k$ is a constant and I is the welding current flowing at any given instant, Hall multiplier means including a crystal and field creating inductors, said composite signal being fed to the crystal to develop a current flow therethrough, said inductors being connected to the means in which a signal proportional to the weld current is developed to multiply the composite signal by a signal proportional to the current to produce in the output circuit of the Hall multiplier a signal equivalent to $(E-kI)$ $I$ to give an instantaneous reading of the total power or voltage across the welding electrodes minus the voltage drop in other portions of the welded members exclusive of the nugget multiplied by the current, integrating means connected to the output of the Hall multiplier to store the instantaneous power signal over the period of the weld to produce a signal proportional to the total amount of energy dissipated in producing the nugget per se exclusive of any loss of energy in voltage drops through other portions of the circuit, and indicating means connected to the output of the integrating means to indicate to the operator whether the total amount of energy dissipated in creating the nugget falls within certain predetermined limits to create a satisfactory weld.

4. In a measuring device for determining the quality of a weld produced by the application of electrical power to a pair of welding electrodes engaging the opposite sides of parts to be welded together, a pair of terminals adapted to be connected to the welding electrodes during the application of electrical power to produce a weld, a coil adapted to be brought into proximity with one of the welding electrodes and acting as a current transformer, first circuit means connected to the pair of terminals and in which a signal proportional to the total voltage developed across the electrodes is developed during application of electric power to produce a weld, a second circuit means connected to the coil and having a signal developed therein proportional to the welding current when welding power is applied to the electrodes, conductive means connecting said second circuit to said first in inverse phase so that the signals tend to subtract to produce a composite signal in said first circuit which is proportional to the total voltage across the welding electrodes minus the voltage drop across all other parts of the welding circuit except the nugget, signal multiplier means including a conductive crystal and magnetic field producing coil, said conductive crystal being connected to the output of the first-named circuit and having applied thereto the composite signal, said magnetic field producing coil being connected to the output of the second circuit so that the output of the signal multiplier means will be representative of the instantaneous power applied to the welding nugget per se, circuit means connected to the output of the signal multiplier means for deriving the total power applied to the weld nugget thereby determining the quality of the weld, and utilization means connected to the output of the last mentioned circuit means and responsive to the output thereof.

5. In a measuring device for determining the quality of a weld produced by the application of electrical power to a pair of welding electrodes engaging the opposite sides of parts to be welded together, a pair of terminals adapted to be connected to the welding electrodes during the application of electrical power to produce a weld, a coil adapted to be brought into proximity with one of the welding electrodes and acting as a current transformer, first circuit means connected to the pair of terminals and in which a signal proportional to the total voltage developed across the welding electrodes is developed during application of electric power to produce a weld, a second circuit means connected to the coil and having a signal developed therein proportional to the welding current when welding power is applied to the welding electrodes, conductive means connecting said second circuit to said first circuit in inverse phase so that the signals tend to subtract to produce a composite signal in said first circuit which is proportional to the total voltage across the welding electrodes minus the voltage drop across all other parts of the welding circuit except the nugget, Hall multiplier means including a conductive crystal and magnetic field producing coil, said conductive crystal being connected to the output of the first-named circuit and having applied thereto the composite signal, said magnetic field producing coil being connected to the output of the second circuit so that the output of the Hall multiplier will be representative of the total instantaneous power applied to the welding nugget per se, integrating means connected to the output of the Hall multiplier to store the instantaneous power readings for the duration of the application of the welding power to read the total energy applied in creating a weld nugget, and indicating means connected to the output of the integrating means for indicating whether the total amount of energy dissipated in creating the nugget falls within predetermined limits to create a satisfactory weld.

6. In a measuring device for determining the quality of a weld produced by the application of electrical power to a pair of welding electrodes engaging the opposite sides of parts to be welded together, a pair of terminals adapted to be connected to the welding electrodes during the application of electrical power to produce a weld, a coil adapted to be brought into proximity with one of the welding electrodes and acting as a current transformer, first circuit means connected to the pair of terminals and in which a signal proportional to the total voltage developed across the welding electrodes is developed during application of electric power to produce a weld, a second circuit means connected to the coil and having a signal developed therein proportional to the welding current when welding power is applied to the welding electrodes, conductive means connecting said second circuit to said first in inverse phase so that the signals tend to subtract to produce a composite signal in said first circuit which is proportional to the total voltage across the welding electrodes minus the voltage drop across all other parts of the welding circuit except the nugget, Hall multiplier means including a conductive crystal and magnetic field producing coil, said conductive crystal being connected to the output of the first-named circuit and having applied thereto the composite signal, said magnetic field producing coil being connected to the output of the second circuit so that the output of the Hall multiplier will be representative of the total instantaneous power applied to the welding nugget per se, integrating means connected to the output of the Hall multiplier to store the instantaneous power readings for the duration of the application of the welding power to read the total energy applied in creating a weld nugget, and indicating means connected to the output of the integrating means to indicate whether the energy applied to create the weld nugget falls within previously determined limits.

7. In a measuring device for determining the quality of a weld produced by the application of electrical power to a pair of welding electrodes engaging the opposite sides of parts to be welded together, a pair of terminals adapted to be connected to the welding electrodes during the application of electrical power to produce a weld, a coil adapted to be brought into proximity with one of the welding electrodes and acting as a current transformer, first circuit means connected to the pair of terminals and in which a signal proportional to the total voltage developed across the electrodes is developed during application of electric power to produce a weld, a second circuit means connected to the coil and having a signal developed therein proportional to the welding current when welding power is applied to the electrodes, a plurality of Hall multipying means including conductive crystals and magnetic control coils, said first Hall multiplier having its conductive crystal connected to the output of the first circuit and its magnetic control coils connected to the output of said second circuit to multiply together the voltages proportional to the current and voltage instantaneously appearing across the weld nugget during formation and said second Hall multiplier having its crystal conductor connected to the output of the second circuit and also its control coils so that its output is equivalent to the current squared, the output of said two conductive crystals being connected in series and producing a signal equivalent to $kEI-I^2$ where $k$ equals a constant, E is the total voltage across the welding electrodes and I is the welding current, amplifying means connected to the output of the series crystals of the Hall multipliers, time integrating means connected to the amplifier ouput to provide a reading of total energy applied to the weld during formation if the nugget, and indicating means connected to the output of the indicator to advise the operator as to whether the total amount of energy dissipated in the formation of the nugget per se will produce a satisfactory weld.

8. A method of testing a spot welding machine to determine whether it is operating properly, comprising the steps of clamping parts to be welded in the spot welding machine, firing the machine to produce a weld nugget between the parts, deriving a signal from the machine which is proportional to the overall power consumed by the electrodes and the parts to be welded over the welding cycle, deriving a second signal proportional to the power consumed during the welding cycle by the electrodes and portions of the parts not included in the weld nugget, subtracting the second signal from the first and integrating the difference to provide a third signal proportional to the energy consumed in the weld nugget per se as an indication of the condition of the weld, and determining whether the value of the third signal falls within predetermined limits to create a satisfactory weld.

9. A method of testing a spot welding machine to indicate whether it is operating properly, comprising the steps of clamping parts to be welded in the spot welding machine, firing the machine to produce a weld nugget between the parts, continuously measuring the overall voltage across the electrodes during the welding cycle to provide a first signal, continuously measuring the voltage drop across the electrodes and portions of the parts except the weld nugget and subtracting this voltage from the overall voltage to give the voltage across the nugget per se and to provide a second signal, continuously measuring the current flow through the welding circuit during the welding cycle to provide a third signal, multiplying the second signal by the third signal to give an indication of the instantaneous power in the weld nugget and to provide a fourth signal, integrating the fourth signal over the time period of the weld cycle and measuring the integrated third signal to provide a reading of the total energy utilized in producing the weld and consequently to provide an indication whether the spot welding machine is operating properly.

10. In a measuring device for determining the quality of a weld produced by the application of electrical power to a pair of welding electrodes engaging the opposite sides of parts to be welded together, circuit means for producing a signal proportional to the voltage across the weld nugget, the circuit means comprising; second means connectible to the welding electrodes in which a signal proportional to the total voltage across the electrodes during the weld is developed, and third means adapted to be brought into proximity with the welding electrodes in which a signal proportional to the weld current flowing is developed, said third means being connected to said second means in inverse phase to the signal proportional to the voltage so that the resultant composite signal in the circuit is proportional to $E - kI$ where E is the total voltage across the welding electrodes, $k$ is a constant and I is the welding current flowing at any given instant whereby the said composite signal is proportional to the voltage across the weld nugget.

11. In a measuring device for determining the quality of a weld produced by the application of electrical power to a pair of welding electrodes engaging the opposite sides of parts to be welded together, means for producing a signal proportional to the voltage across the weld nugget, the said means comprising; a pair of terminals adapted to be connected to the welding electrodes during the application of electrical power to produce a weld, a coil adapted to be brought into proximity with one of the welding electrodes and acting as a current transformer, first circuit means connected to the pair of terminals and in which a signal proportional to the total voltage across the electrodes is developed during application of electric power to produce a weld, a second circuit means connected to the coil and having a signal developed therein proportional to the welding current when welding power is applied to the electrodes, and conductive means connecting said second circuit to said first in inverse phase so that the signals tend to subtract to produce a composite signal in said first circuit which is proportional to the voltage across the welding nugget.

References Cited

UNITED STATES PATENTS

| | | | |
|---|---|---|---|
| 2,848,595 | 8/1958 | Van Sciver | 219—110 X |
| 2,958,044 | 10/1960 | Storm et al. | 219—110 X |
| 3,194,939 | 7/1965 | Hill | 219—110 X |
| 3,240,961 | 3/1966 | Noth | 219—110 X |

OTHER REFERENCES

IBM Technical Disclosure Bulletin, "Welder Control Circuit," by H. R. Gates, vol. 4, No. 9, February 1962, pages 36 and 37.

RICHARD M. WOOD, *Primary Examiner.*

B. A. STEIN, *Assistant Examiner.*